(12) United States Patent  
Okada (10) Patent No.: US 7,675,981 B2  
(45) Date of Patent: Mar. 9, 2010

(54) OFDM SIGNAL DEMODULATOR CIRCUIT AND OFDM SIGNAL DEMODULATING METHOD

(75) Inventor: Kunio Okada, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 920 days.

(21) Appl. No.: 11/181,239

(22) Filed: Jul. 14, 2005

(65) Prior Publication Data

US 2006/0023800 A1 Feb. 2, 2006

(30) Foreign Application Priority Data

Jul. 28, 2004 (JP) ............................ 2004-220240

(51) Int. Cl.
*H04K 1/00* (2006.01)
*H04J 11/00* (2006.01)

(52) U.S. Cl. ...................................... 375/260; 370/208

(58) Field of Classification Search ................. 375/260, 375/350, 354, 316, 324; 370/286, 203, 208, 370/210, 491

See application file for complete search history.

(56) References Cited

U.S. PATENT DOCUMENTS

| | | | |
|---|---|---|---|
| 6,862,262 B1* | 3/2005 | Imamura | 370/210 |
| 6,954,421 B2* | 10/2005 | Kuwabara et al. | 370/203 |
| 7,139,320 B1* | 11/2006 | Singh et al. | 375/260 |
| 7,313,086 B2* | 12/2007 | Aizawa | 370/208 |
| 7,388,922 B2* | 6/2008 | Yamagata | 375/260 |
| 7,471,728 B2* | 12/2008 | Brutel et al. | 375/260 |
| 2003/0128656 A1* | 7/2003 | Scarpa | 370/203 |
| 2003/0128660 A1* | 7/2003 | Ito et al. | 370/210 |
| 2004/0008618 A1* | 1/2004 | Shirakata et al. | 370/208 |
| 2005/0094738 A1* | 5/2005 | Park et al. | 375/260 |
| 2005/0105647 A1* | 5/2005 | Wilhelmsson et al. | 375/316 |
| 2005/0174929 A1* | 8/2005 | Hayashi et al. | 370/208 |

FOREIGN PATENT DOCUMENTS

CN 1420648 A 5/2003

(Continued)

OTHER PUBLICATIONS

Japanese Office Action (and English translation thereof) dated Mar. 25, 2008, issued in a counterpart Japanese Application.

(Continued)

*Primary Examiner*—Chieh M Fan
*Assistant Examiner*—Aristocratis Fotakis
(74) *Attorney, Agent, or Firm*—Frishauf, Holtz, Goodman & Chick, P.C.

(57) ABSTRACT

When an OFDM demodulator circuit performs the waveform equivalence of carrier signals outputted from an FFT processing circuit, the OFDM demodulator circuit extracts correction coefficients corresponding to the gain of a reception signal outputted from a tuner unit from a correction coefficient table, and phase corrections are performed in a phase correction circuit based on the extracted correction coefficients. After that, the OFDM demodulator circuit performs the waveform equivalence processing with a transmission path equivalent circuit. Thereby, even if a C/N value is deteriorated owing to the amplification of an OFDM signal, the influence on the receiving performance of a receiving apparatus can be curbed, and a receiving performance can be improved.

4 Claims, 7 Drawing Sheets

FOREIGN PATENT DOCUMENTS

| | | |
|---|---|---|
| EP | 1 313 242 A | 5/2003 |
| EP | 1 313 242 A1 | 5/2003 |
| EP | 1 313 282 * | 5/2003 |
| EP | 1 349 335 A | 10/2003 |
| JP | 2002-344410 A | 11/2002 |
| WO | WO 99/01956 A1 | 1/1999 |
| WO | WO 02/17529 A1 | 2/2002 |

OTHER PUBLICATIONS

International Preliminary Report on Patentability, Chapter I of the Patent Cooperation Treaty, and Written Opinion of the International Searching Authority, dated Feb. 8, 2007, for PCT/JP2005/013899, 8 sheets.

Chinese Office Action dated Dec. 5, 2008 (5 pages), and English translation thereof (4 pages), issued in a counterpart Chinese Application No. 2005800009861.

* cited by examiner

| dBm | CARRIER NUMBER | | | | |
|---|---|---|---|---|---|
| | 0 | 1 | 2 | ...... | 431 |
| ⋮ | | | | ...... | |
| -40 | 0 | | | ...... | |
| ⋮ | | | | ...... | |
| -60 | +3 | | | ...... | |
| ⋮ | | | | ...... | |
| -80 | -7 | | | ...... | |
| ⋮ | | | | ...... | |

| dBm | | CARRIER NUMBER | | | | |
|---|---|---|---|---|---|---|
| | | 0 | 1 | 2 | ...... | 431 |
| ⋮ | | | | | ...... | |
| -40 | A | | | | ...... | |
| | B | | | | ...... | |
| ⋮ | | | | | ...... | |
| -60 | A | | | | ...... | |
| | B | | | | ...... | |
| ⋮ | | | | | ...... | |
| -80 | A | | | | ...... | |
| | B | | | | ...... | |
| ⋮ | | | | | ...... | |

FIG 9
PRIOR ART

OFDM SIGNAL DEMODULATOR CIRCUIT AND OFDM SIGNAL DEMODULATING METHOD

CROSS-REFERENCE TO RELATED APPLICATIONS

This application is based upon and claims the benefit of priority from the prior Japanese Patent Application No. 2004-220240, filed on Jul. 28, 2004, and the entire contents of which are incorporated herein by reference.

BACKGROUND OF THE INVENTION

1. Field of the Invention

The present invention relates to an orthogonal frequency division multiplex (OFDM) signal demodulator circuit and an OFDM demodulating method, which demodulate an OFDM signal received by a tuner.

2. Description of the Related Art

The orthogonal frequency division multiplexing (OFDM) system, by which a plurality of carriers (carrier waves) can be multiplexed to be transmitted and received, is used as a modulation system in the terrestrial digital television broadcasting.

Because the broadcast radio waves of the OFDM system are feeble, it is necessary to amplify the signals by an automatic gain control (AGC) amplifying circuit or the like in a tuner unit.

However, an amplification of a signal in the tuner unit is accompanied by generation of nonlinear distortion owing to transient phenomena or the like of various analog devices constituting the tuner unit. Then, the generated nonlinear distortion is superimposed on the signal, and the C/N value of an output signal of the tuner unit is deteriorated.

Moreover, because the signal having a deteriorated C/N value is inputted into a demodulating unit, a rate of the signals which are not demodulated in the demodulating unit to be regarded as errors increases, and consequently the receiving performance of the tuner unit has been influenced by the increased rate.

Moreover, when an amplification degree by the AGC (variable gain amplifier) becomes larger, the degree of nonlinear distortion generated in the tuner becomes larger, and a phase changes from that of an input signal. Then, the changed phase is generated as phase distortion. Consequently, the C/N value of the output signal of the tuner unit is further deteriorated, and the receiving performance is further influenced by the deterioration of the C/N value.

SUMMARY OF THE INVENTION

According to the present invention, when an OFDM demodulator circuit performs the waveform equivalence of carrier signals after FFT processing, the OFDM demodulator circuit extracts correction coefficients corresponding to the gain of a reception signal outputted from a tuner unit from a correction coefficient table, and the OFDM demodulator circuit performs waveform equivalence processing after performing phase corrections of the carrier signals after the FFT processing based on the extracted correction coefficients.

Thereby, it becomes possible to provide an OFDM signal demodulator circuit and an OFDM signal demodulating method both of which curb the influence on the receiving performance of a receiving apparatus caused by the deterioration of a C/N value accompanying the amplification of the received reception signal of the OFDM system and then improve a receiving performance.

DETAILED DESCRIPTION OF THE PREFERRED EMBODIMENTS

Hereinafter, a concrete embodiment of the present invention is described with reference to the attached drawings. However, the scope of the invention is not limited to the shown examples.

In Japan, the frequency band of the broadcast radio wave used for the terrestrial digital television broadcasting is 300 MHz of from 470 MHz to 770 MHz, and this frequency bandwidth is divided into 50 channels of 13-62 chs. The divided frequency bandwidths are assigned to each broadcasting station.

Figure 9:
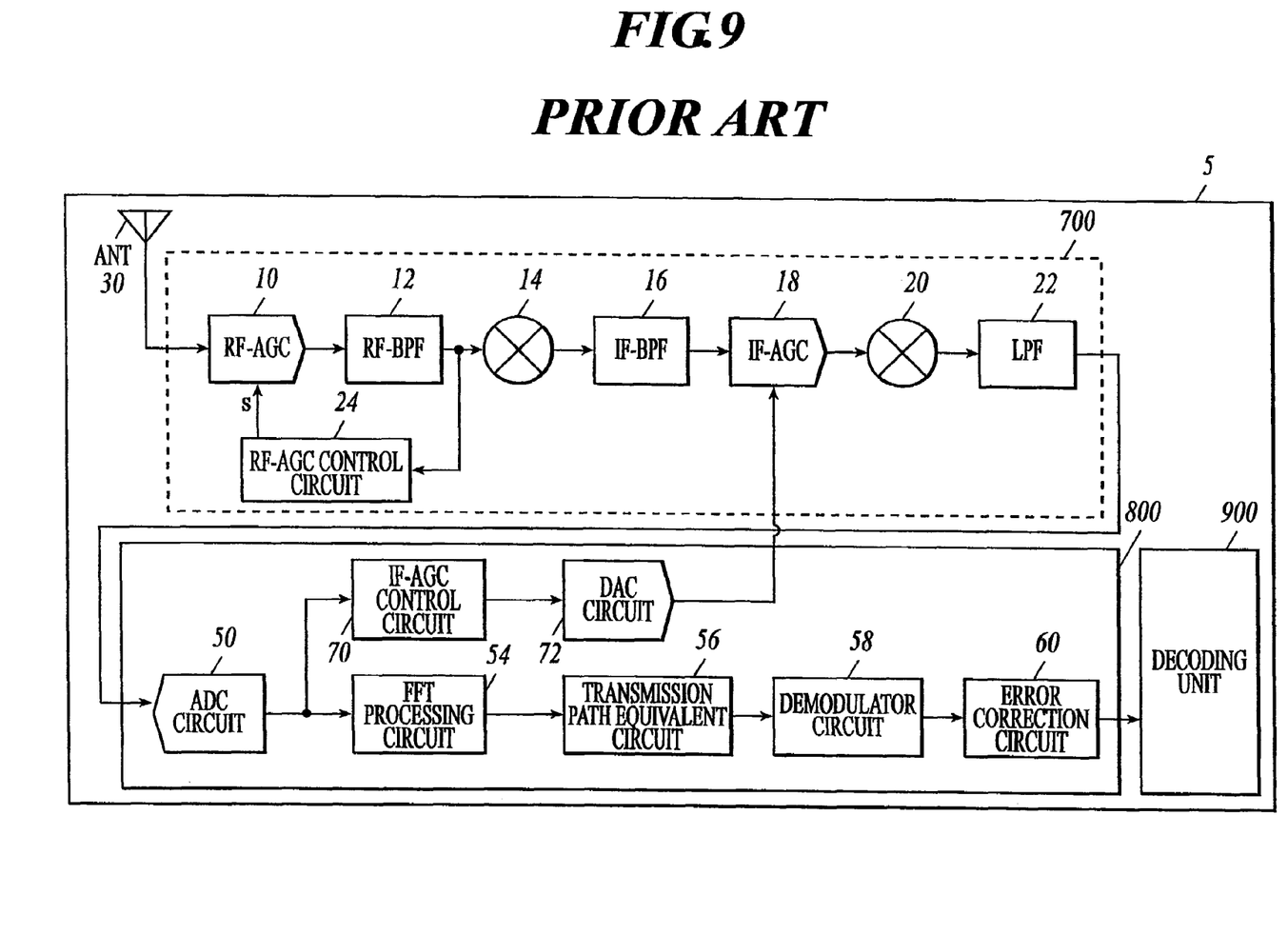
FIG. 9 is a block configuration diagram of a conventional OFDM signal receiving apparatus.

Before describing the present invention, FIG. 9 is used for describing the functional configuration of a conventional OFDM signal receiving apparatus 5 briefly.

FIG. 9 is a block diagram of the conventional OFDM signal receiving apparatus 5, which incorporates an OFDM signal demodulator circuit for receiving an OFDM signal used for terrestrial digital television broadcasting.

According to the diagram, the OFDM signal receiving apparatus 5 is composed of an external antenna ANT30, a tuner unit 700, a demodulating unit 800 and a decoding unit 900.

In the OFDM signal receiving apparatus 5, a reception signal in the channel band of a broadcasting station selected by a user among the reception signals of the OFDM system received by the tuner unit 700 is outputted to the OFDM demodulating unit 800. Then, the OFDM demodulating unit 800 demodulates the inputted reception signal to extract the data of a signal format called as Transport Stream (TS), which is suitable for transmission, and outputs the TS to the decoding unit 900. The decoding unit 900 performs the decoding processing of the inputted TS, and the processed TS is outputted as the display and the sound of the television broadcasting by an apparatus including the OFDM signal receiving apparatus 5 therein. Here, the conventional tuner unit 700 and the conventional demodulating unit 800 are described.

First, the tuner unit 700 is equipped with a radio frequency-automatic gain control (RF-AGC) 10, a radio frequency-band pass filter (RF-BPF) 12, a RF mixer 14, an intermediate frequency-band pass filter (IF-BPF) 16, an IF-AGC 18, an IF mixer 20, a low pass filter (LPF) 22 and a RF-AGC control circuit 24, and the tuner unit 700 is configured to be connected with the external antenna ANT30 at the RF-AGC 10.

An orthogonal frequency division multiplex signal (OFDM signal), in which information is divided into a plurality of carriers (carrier waves) and the orthogonal modulation of the information has been performed, is received by the external antenna ANT30.

The RF-AGC 10 is a circuit which amplifies the reception signal received by the external antenna ANT30. The RF-AGC 10 outputs the amplified reception signal to the RF-BPF 12.

The RF-BPF 12 is a circuit which extracts the reception signal of the frequency band equivalent to the channel of the broadcasting station selected by the user among the reception signals inputted from the RF-AGC 10 to output the extracted reception signal of the OFDM system to the RF mixer 14. Moreover, the RF-BPF 12 outputs the extracted reception signal of the OFDM system to the RF-AGC control circuit 24.

The RF-AGC control circuit 24 detects (calculates) the amplification gain of the RF-AGC 10 based on the input signal level of the inputted reception signal, and outputs a control signal S to the RF-AGC 10 based on the detected gain.

Moreover, the RF-AGC 10 amplifies the reception signal received by the external antenna ANT30 based on the control signal S inputted from the RF-AGC control circuit 24, and outputs the amplified reception signal to the RF-BPF 12.

The RF mixer 14 mixes the reception signal inputted from the RF-BPF 12 and a local oscillation signal inputted from a first local oscillation circuit (not shown) to convert the reception signal into a signal having a first intermediate frequency. Then, the RF mixer 14 outputs the converted signal having the first intermediate frequency to the IF-BPF 16.

The IF-BPF 16 extracts the signal of the channel of the broadcasting station selected by the user from the signals having the first intermediate frequency inputted from the RF mixer 14, and outputs the extracted signal to the IF-AGC 18. Furthermore, the IF-AGC 18 amplifies the signal having the first intermediate frequency inputted from the IF-BPF 16, and outputs the amplified signal to the IF mixer 20.

The IF mixer 20 mixes the signal inputted from the IF-AGC 18 and a local oscillation signal inputted from a second local oscillation circuit (not shown) to convert the inputted signal into a signal having a second intermediate frequency. Then, the IF mixer 20 outputs the converted signal to the LPF 22. The LPF 22 performs the filter processing of the signal outputted from the IF mixer 20, and outputs the processed signal to the ADC circuit 50 of the demodulating unit 800.

Successively, the demodulating unit 800 is described. The demodulating unit 800 is composed of an analog digital converter (ADC) circuit 50, a fast Fourier transform (FFT) processing circuit 54, a transmission path equivalent circuit 56, a demodulator circuit 58, an error correction circuit 60, an IF-AGC control circuit 70 and a DAC circuit 72.

The ADC circuit 50 is a circuit which converts an analog signal inputted from the LPF 22 of the tuner circuit 700 into a digital signal and outputs the converted digital signal. The ADC circuit 50 outputs the digital signal after the conversion to the FFT processing circuit 54 and the IF-AGC control circuit 70.

Here, the IF-AGC control circuit 70 is a circuit which generates a signal controlling the IF-AGC 18 based on the signal inputted from the ADC circuit 50. For example, when the signal level of the digital signal outputted from the ADC circuit 50 is lower (higher) than a predetermined signal level, the IF-AGC control circuit 70 generates a control signal for amplifying (reducing) the signal outputted from the IF-AGC 18 to a suitable level. Then, the control signal is converted into an analog signal in the DAC circuit 72, and is outputted to the IF-AGC 18.

The FFT processing circuit 54 is a circuit for performing a FFT operation of a time domain signal converted into a digital signal by the ADC circuit 50 to output the carriers (carrier waves) converted into a frequency domain signal by the FFT operation processing to the transmission path equivalent circuit 56.

Moreover, the FFT processing circuit 54 extracts a complex signal ((I, Q) data signal) composed of a real axis component (I data signal) and an imaginary axis component (Q data signal) with the FFT operation processing to output the extracted complex signal to the transmission path equivalent circuit 56 as a frequency domain signal.

The transmission path equivalent circuit 56 is a circuit for performing waveform equivalence processing pertaining to an amplitude or a phase using a synchronizing signal (SP signal=scatter pilot signal) included in the frequency domain signal inputted from the FFT processing circuit 54. Then, the transmission path equivalent circuit 56 outputs the frequency domain signal to which the waveform equivalence processing has been performed to the demodulator circuit 58.

Here, the synchronizing signal is a carrier signal (carrier wave signal) with predetermined electric power and a predetermined phase for performing waveform equivalence on the reception side, and a signal inserted into frequency domain signals at a predetermined rate.

The demodulator circuit 58 is a circuit for demodulating data based on the frequency domain signal inputted from the transmission path equivalent circuit 56. For example, the demodulator circuit 58 demodulates data by demodulating an inputted signal in accordance with 16QAM system. Then, the demodulator circuit 58 outputs the demodulated data to the error correction circuit 60.

The error correction circuit 60 performs an error correction of the data inputted from the demodulator circuit 58. The method of the error correction is realized by, for example, using a convolutional code, a Reed Solomon code (RS code) or the like. Then, the error correction circuit 60 outputs the signal the errors of which have been corrected as the TS to the decoding unit 900.

Next, although the receiving apparatus of the terrestrial digital television broadcasting using an OFDM signal demodulator apparatus of the present invention is described with reference to FIG. 1, the thing to which the present invention can be applied is not limited to the described receiving apparatus.

1. Outline

An OFDM signal receiving apparatus 1 is composed of an antenna ANT30, a tuner unit 100, a demodulating unit 200 and a decoding unit 300. From a reception signal received by the antenna ANT30, which signal is in accordance with the OFDM system, in which information is divided into a plurality of carriers and is modulated by the orthogonal modulation, a signal of the channel band of a broadcasting station selected by the tuner unit 100 is extracted. Then, the extracted signal is inputted into the demodulating unit 200, and the demodulating unit 200 extracts the data of a signal format suitable for transmission, which signal format is called as the transport stream (TS), from the extracted signal to output the extracted data to the decoding unit 300. Then, the decoding unit 300 separates a sound signal, a picture signal and a data signal from the TS, and decodes the separated signals to output the decoded signals to a TV receiver. Hereinafter, the tuner unit 100 and the demodulating unit 200 are described. Incidentally, the same components as those of the conventional OFDM signal receiving apparatus 5 described with reference to FIG. 9 are denoted by the same reference marks as those of the conventional OFDM signal receiving apparatus 5, and their detailed descriptions are omitted.

2. Tuner Unit

The tuner unit 100 is equipped with the RF-AGC 10, the RF-BPF 12, the RF mixer 14, the IF-BPF 16, the IF-AGC 18, the IF mixer 20, the LPF 22 and the RF-AGC control circuit 24, and is configured to be connected to the external antenna ANT30 at the RF-AGC 10.

An orthogonal frequency division multiplex signal (OFDM signal), in which information is divided into a plurality of carriers and the orthogonal modulation is performed, is first received by the external antenna ANT30.

The reception signal received by the external antenna ANT30 is amplified by the RF-AGC 10. Then, a reception signal of the frequency band equivalent to the channel of the broadcasting station selected by a user is extracted by the RF-BPF 12. The extracted reception signal is converted into an intermediate frequency signal (IF signal) by the RF mixer 14. Then, from the intermediate frequency signal, the signal of the channel of the broadcasting station selected by the user is extracted by the IF-BPF 16, and is amplified by the IF-AGC 18. Furthermore, the intermediate frequency signal amplified by the IF-AGC 18 is converted into a low frequency second intermediate frequency signal by the IF mixer 20, and receives filter processing by the LPF 22. After that, the processed intermediate frequency signal is outputted to the demodulating unit 200. Moreover, the signal inputted into the RF-AGC control circuit 24 is converted into a digital signal by an ADC circuit 26 in the RF-AGC control circuit 24, and is outputted to a gain acquisition circuit 80 of the demodulating unit 200.

3. Demodulating Unit

3.1 Demodulation

The demodulating unit 200 is composed of the ADC circuit 50, the FFT processing circuit 54, the transmission path equivalent circuit 56, the demodulator circuit 58, the error correction circuit 60, the IF-AGC control circuit 70, the DAC circuit 72, the gain acquisition circuit 80, a correction coefficient table 82 and a phase correction circuit 84.

Figure 2:
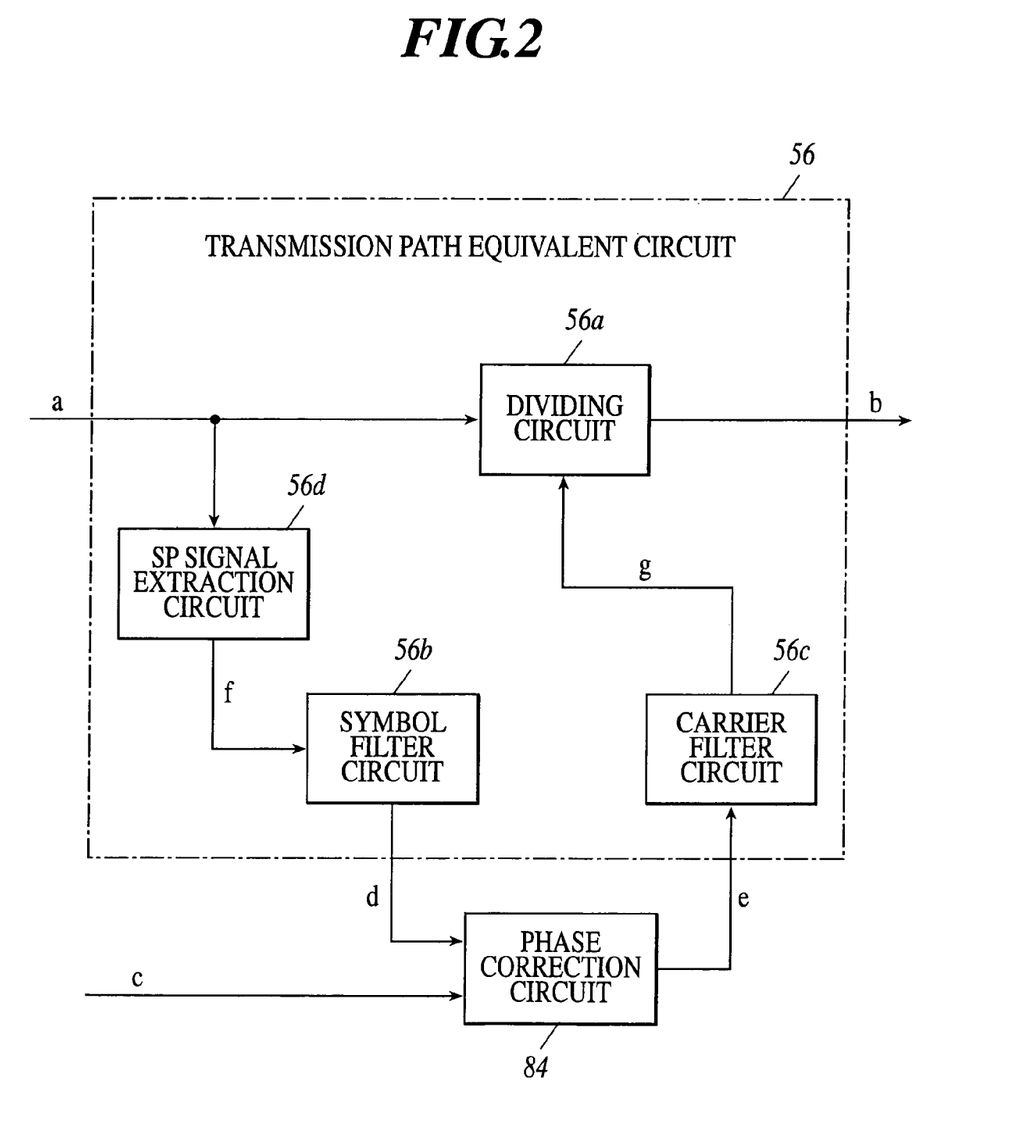
FIG. 2 is a block diagram showing a transmission path equivalent circuit and a phase correction circuit in the present invention.

Moreover, as shown in FIG. 2, the transmission path equivalent circuit 56 is composed of a dividing circuit 56a, a symbol filter circuit 56b, a carrier filter circuit 56c and a SP signal extraction circuit 56d. Then, the phase correction circuit 84 is connected so as to intervene between the output (signal d) of the symbol filter circuit 56b and the input (signal e) of the carrier filter circuit 56c.

A signal outputted from the tuner unit 100 is converted into a digital signal by the ADC circuit 50. The digital signal converted by the ADC circuit 50 is outputted to the IF-AGC control circuit 70 and the FFT processing circuit 54.

The FFT processing circuit 54 is a circuit performing the FFT operation of a time domain signal converted into the digital signal by the ADC circuit 50 to output carriers (carrier waves) converted into a frequency domain signal by the FFT operation processing to the transmission path equivalent circuit 56.

Moreover, the FFT processing circuit 54 extracts a complex signal ((I, Q) data signal) composed of a real axis component (I data signal) and an imaginary axis component (Q data signal) by the FFT operation processing to output the complex signal to the transmission path equivalent circuit 56 as a frequency domain signal.

The carrier signal outputted from the FFT processing circuit 54 receives waveform equivalence (amplitude equivalence and phase equivalence) processing by the transmission path equivalent circuit 56. Here, as for the waveform equivalence processing, the waveform equivalence processing is performed based on a synchronizing signal having received phase correction by the phase correction circuit 84 or a carrier signal including the synchronizing signal. Then, the frequency domain signal which has received the processing by the transmission path equivalent circuit 56 is inputted into the demodulator circuit 58, and the demodulation processing thereof is performed. After that, the error correction processing of the frequency domain signal is performed by the error correction circuit 60, and a TS is extracted.

Here, the waveform equivalence processing in the transmission path equivalent circuit 56 is described.

The inner configuration of the transmission path equivalent circuit 56 and the phase correction circuit 84 are shown in FIG. 2. The transmission path equivalent circuit 56 extracts a synchronizing signal (SP signal) among the inputted carrier signals with the SP signal extraction circuit 56d, and outputs the extracted SP signal to the symbol filter circuit 56b. The symbol filter circuit 56b is a circuit performing the following operations: inputting the synchronizing signal from the SP signal extraction circuit 56d, filtering the inputted synchronizing signal in a time axis direction to perform interpolation processing, and performing the estimation processing of the transmission path characteristic in the time axis direction of the carrier signal. Then, the carrier including the synchronizing signal which has received the interpolation processing in the time axis direction is outputted to the phase correction circuit 84 (signal d).

The phase correction circuit 84 performs the phase correction of the inputted carrier including the synchronizing signal using a correction coefficient stored in the correction coefficient table 82, and outputs the carrier including the synchronizing signal after the phase correction to the carrier filter circuit 56c in the transmission path equivalent circuit 56 (signal e).

Here, the RF-AGC 10 and the IF-AGC 18 of the tuner unit 100 adjust an amplification degree according to the level of the signal received by the antenna ANT30. In this case, because the change quantity of a phase change (phase distortion) to be generated differs according to the amplification degree to be adjusted, the phase correction circuit 84 corrects the phase change.

The carrier filter circuit 56c is a circuit for performing the following processing: filtering inputted carriers including synchronizing signals after the phase correction into a frequency axis direction to perform interpolation processing, estimating the frequency characteristics of amplitudes and phases to the frequency axis direction of all of the carriers to output the estimation result to the dividing circuit 56a, and thereby estimating the frequency characteristics of the transmission path.

The dividing circuit 56a performs waveform equivalence processing to a frequency domain signal inputted from the FFT processing circuit 54 by performing division processing to the frequency domain signal inputted from the FFT processing circuit 54 and a signal inputted from the carrier filter circuit 56c.

Next, a phase correction in the transmission path equivalent circuit 56 is described.

3.2 Phase Correction

First, the gain acquisition circuit 80 acquires the gain of a reception signal by inputting a signal converted into a digital signal by the ADC circuit 26 in the RF-AGC control circuit 24 of the tuner unit 100 among the signals inputted into the RF-AGC control circuit 24. Then, the gain acquisition circuit 80 outputs the acquired gain to the correction coefficient table 82. The correction coefficient table 82 extracts a correction coefficient corresponding to the inputted gain from a memory included in the correction coefficient table 82, and outputs the extracted correction coefficient to the phase-correction circuit 84 (signal c).

The phase correction circuit 84 performs a phase correction to the symbol filter coefficient (signal d) inputted from the transmission path equivalent circuit 56 based on the inputted correction coefficient. Here, the phase correction coefficient table 82 and the phase correction circuit 84 are described below in detail.

First, the correction coefficient table 82 is described. The correction coefficient table 82 is a circuit which stores the gains of the reception signals received by the tuner unit 100 correspondingly to correction coefficients (phase correction angles) in the memory in the correction coefficient table 82 and outputs a correction coefficient corresponding to a gain to the phase correction circuit 84. Here, as a method of determining the correction coefficients stored in the correction coefficient table 82, for example, phase change characteristics (relations between input signals and phase changes) of tuners are measured to every tuner, and the correction coefficients are determined from the measured phase change value to each input signal. Then, the determined correction coefficients are stored in the correction coefficient table 82 at the time of factory shipment beforehand. Thereby, because it is enabled to store the correction coefficients suitable for each tuner in the correction coefficient table 82, the optimum correction processing can be performed to every OFDM signal receiving apparatus 1.

Figure 3:
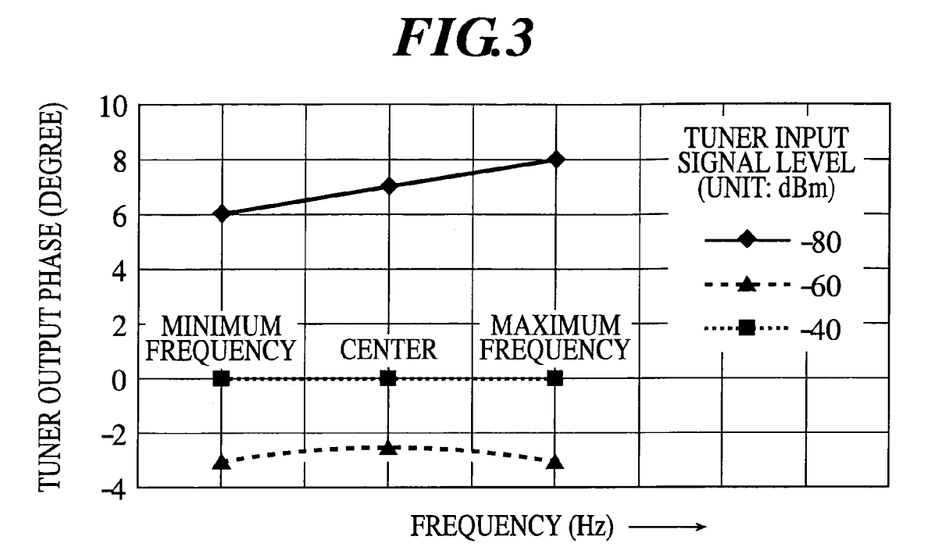
FIG. 3 is a view showing output phases to signal levels of a tuner.

FIG. 3 shows an example of the phase change characteristic of a tuner. The graph of FIG. 3 is a graph plotting tuner output phases (degrees) on the ordinate axis thereof and frequencies (Hz) on the abscissa axis thereof and showing the phases at each of the maximum frequency, the center frequency and the maximum frequency of the reception signals corresponding to input signal levels of the tuner. The output phases of the tuner here show how many degrees the phase is shifted when an original position is set as the degree of "0." For example, it is known that when the input level of a reception signal of the OFDM system inputted into the tuner is "−80 dBm", the quantities of the phases shifted from the original position are "+6 degrees" at the minimum frequency, "+7 degrees" at the center frequency and "+8 degrees" at the maximum frequency. Here, the description is given about a case where the frequency in the present embodiment is supposed to use the center frequency.

Because the phase shifts by "+7 degrees" at the center frequency when the level of an input signal is "−80 dBm", the correction coefficient table 82 stores "−7 degrees" as the phase correction angle (correction coefficient) correspondingly to "−80 dBm." Similarly, because the phase shifts by "−2.5 degrees" at the center frequency when the level of an input signal is "−60 dBm", the correction coefficient table stores "+2.5 degrees" as the phase correction angle correspondingly to "−60 dBm." Moreover, because the phase does not shift ("0 degrees") when the level of an input signal is "−40 dBm", the correction coefficient table stores "0 degrees" (no correction) as the phase correction angle correspondingly to "−40 dBm."

As a result, for example, when the input signal level acquired by the gain acquisition circuit 80 is "−80 dBm", the correction coefficient table 82 reads a phase correction angle of "−7 degrees" from the internal memory, and outputs the read phase correction angle of "−7 degrees" to the phase correction circuit 84.

Furthermore, a plurality of carriers (carrier waves) is included in a frequency domain signal. For example, 432 carriers are included in one segment of an OFDM signal of the ISDB-T system (MODE 3).

A frequency domain signal outputted from the FFT processing circuit 54 is inputted into the transmission path equivalent circuit 56 at every carrier. As an example, a frequency domain signal inputted into the transmission path equivalent circuit 56 is supposed to be inputted in the sequence of from a low frequency carrier (carrier number "0") to a high frequency carrier (carrier number "431").

Figure 4:
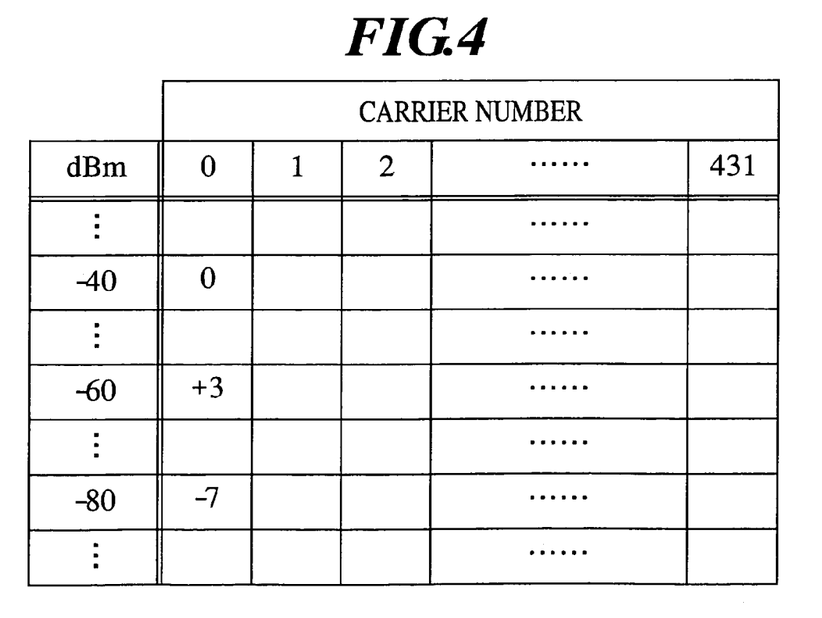
FIG. 4 is a view showing an example of the data configuration of a correction coefficient table in the present invention.

FIG. 4 is a view showing an example of the data configuration at the time of storing phase correction angles as the correction coefficients stored in the correction coefficient table 82. The gains corresponding to the levels of input signals and the phase correction angles as the correction coefficients are correspondingly stored to every carrier of the reception signals of the OFDM system. For example, when an input signal level is "60 dBm", "+3 degrees" is read.

In such a way, the correction coefficients are stored to every carrier, and phase correction processing is processed based on the stored correction coefficients. Thereby, it becomes possible to perform a finer phase correction corresponding to each carrier. Moreover, because the correction coefficient table 82 can store the optimal correction coefficients therein to every tuner unit 100, it becomes possible to improve the performance of the OFDM signal receiving apparatus 1 furthermore.

Successively, the operation principle of the phase correction circuit 84 is described. The phase correction circuit 84 is a circuit which performs the phase correction of a symbol filter coefficient extracted by the symbol filter circuit 56b in the transmission path equivalent circuit 56. To put it concretely, a symbol filter coefficient (signal d) inputted into the phase correction circuit 84 is a complex signal, and the phase correction circuit 84 performs the phase correction of an I data signal as the real part of the complex signal to an Ia data signal, and performs the phase correction of a Q data signal as the imaginary part of the complex signal to a Qa data signal. The processing operation in the phase correction circuit 84 is shown in FIG. 5 as a diagram.

Figure 5:
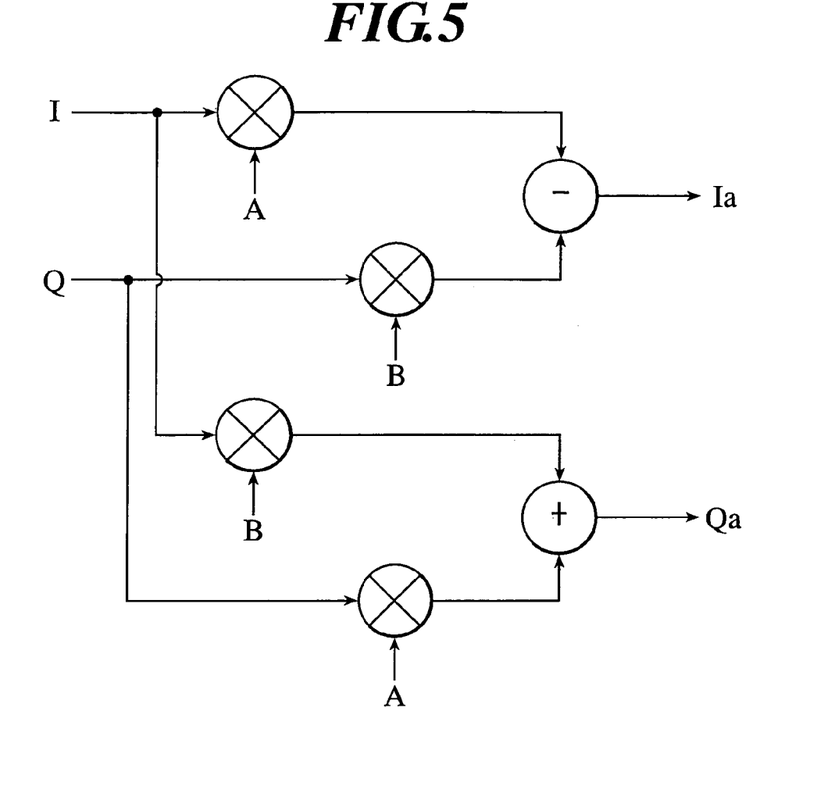
FIG. 5 is a diagram for illustrating the operation of the phase correction circuit in the present invention.

According to FIG. 5, a subtraction result of a value acquired by multiplying the I data signal by a coefficient A and a value acquired by multiplying the Q data signal by a coefficient B is supposed to be an Ia data signal. Moreover, an addition result of a value acquired by multiplying the I data signal by the coefficient B and a value acquired by multiplying the Q data signal by the coefficient A is supposed to be a Qa data signal.

The operation of the phase correction circuit 84 is expressed by the arithmetic expression of a formula (1).

$$\begin{bmatrix} Ia \\ Qa \end{bmatrix} = \begin{bmatrix} I & -Q \\ Q & I \end{bmatrix} \begin{bmatrix} A \\ B \end{bmatrix} \quad \text{Formula (1)}$$

Hereupon, the coefficients A and B are predetermined coefficients calculated from the phase correction angles extracted from the correction coefficient table 82. For example, as an example, when a phase angle is α, the coefficients A and B can be calculated as cos α and sin α, respectively.

$$\begin{pmatrix} Ia \\ Qa \end{pmatrix} = \begin{pmatrix} I\cos\alpha - Q\sin\alpha \\ I\sin\alpha + Q\cos\alpha \end{pmatrix} \quad \text{Formula (2)}$$

Figure 6:
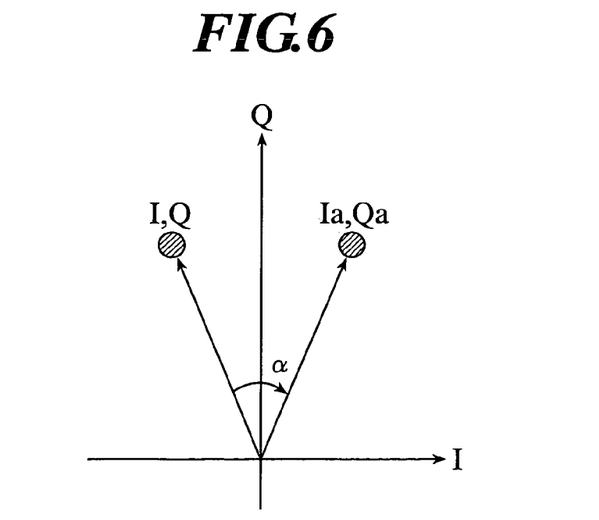
FIG. 6 is an image view in the case where a correction of a phase angle $\alpha$ is performed to an (I, Q) data signal.

Also when the formula (2) is realized with the circuit elements of multiplication circuits, addition circuits and subtraction circuits, the realized circuit becomes similar one to one shown in FIG. 5. First, the coefficients A and B are calculated by the phase correction circuit 84 from an angle α. Here, a subtraction between a signal acquired by multiplying the I data signal by the coefficient A and a signal acquired by multiplying the Q data signal by the coefficient B is performed to be outputted as the Ia data signal. Moreover, an addition of a signal acquired by multiplying the I data signal by the coefficient B and a signal acquired by multiplying the Q data signal by the coefficient A is performed to be outputted as the Qa data signal. An image in the case where an (Ia, Qa) data signal is acquired by performing such a correction of the phase angle α to an (I, Q) data signal is shown in FIG. 6.

3.3 Transmission Path Equivalent Circuit

Figure 1:
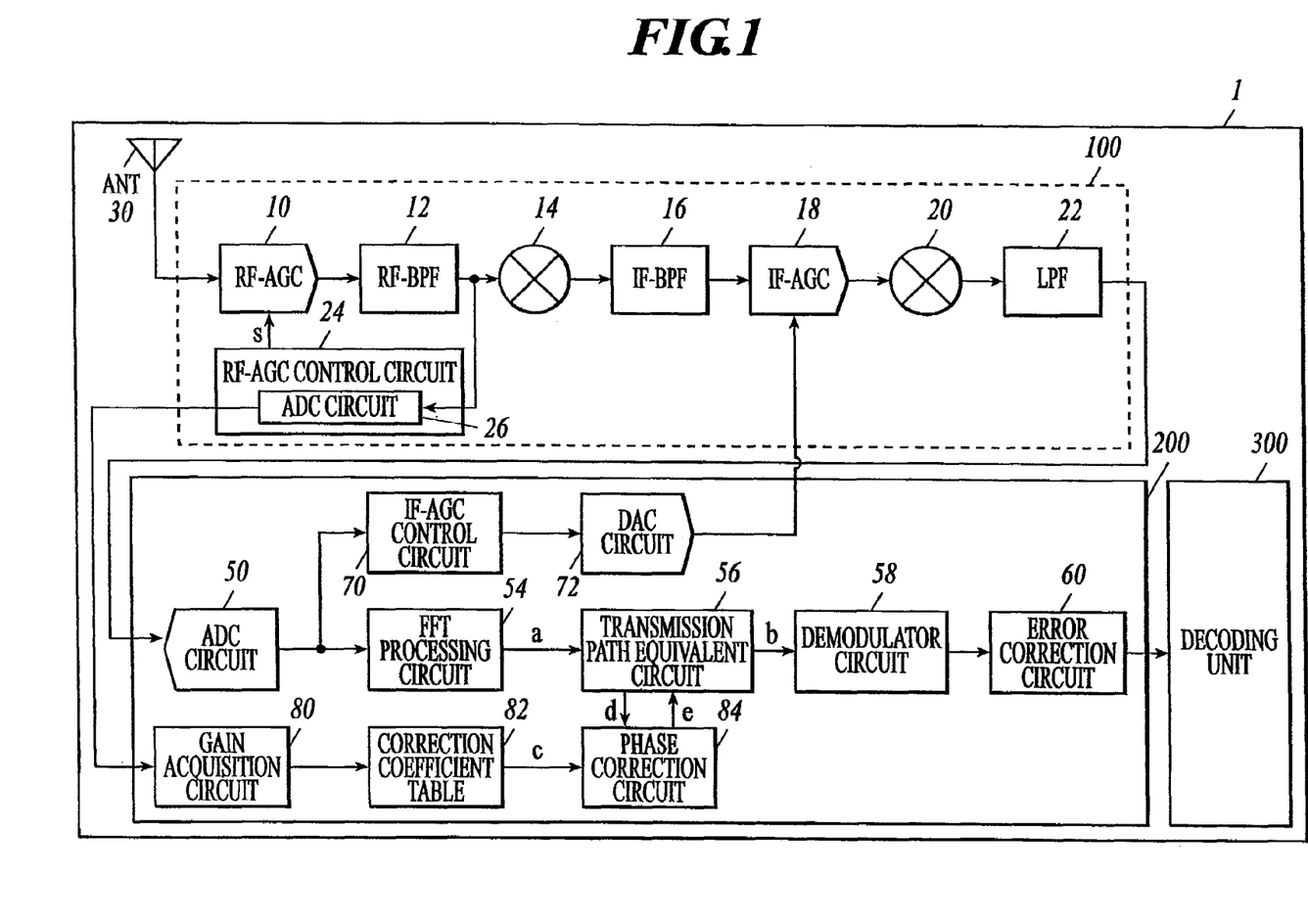
FIG. 1 is a block configuration diagram of the OFDM signal receiving apparatus in the present invention.

Successively, the operation of the transmission path equivalent circuit 56 is described using FIGS. 1 and 2.

As shown in FIG. 2, the transmission path equivalent circuit 56 extracts a synchronizing signal (SP signal) among the carrier signals inputted from the FFT processing circuit 54 with the SP signal extraction circuit 56d, and outputs the extracted synchronizing signal to the symbol filter circuit 56b (signal f).

By filtering the synchronizing signal extracted by the SP signal extraction circuit 56d in the time axis direction, the symbol filter circuit 56b performs interpolation processing, and extracts (calculates) a correction quantity in the time axis direction of the synchronizing signal. Furthermore, based on the transmission path characteristic of the synchronizing signal after the correction, the symbol filter circuit 56b also extracts (calculates) correction quantities in the time axis direction of the carriers other than the synchronizing signal in the time axis direction. Then, the symbol filter circuit 56b outputs the correction quantities of the carriers including the synchronizing signal the transmission path characteristic of which has been corrected as a symbol filter coefficient to the phase correction circuit 84 (signal d).

The phase correction circuit 84 performs the phase correction of a symbol filter coefficient inputted from the transmission path equivalent circuit 56 by converting an I data signal as a real part into an Ia data signal, and by converting a Q data signal as an imaginary part into a Qa data signal. As mentioned above, the processing operation at this time inputs a correction coefficient, which has been stored correspondingly to every carrier beforehand, from the phase correction coefficient table 82 based on the circuit shown in FIG. 5, and performs phase correction processing based on the inputted correction coefficient.

That is, the phase correction circuit 84 calculates the coefficients A and B from the phase correction angle inputted from the correction coefficient table 82. For example, when a phase angle is set to be α, the coefficients A and B can be calculated as the coefficients A=cos α and the coefficient B=sin α. Then, the phase correction circuit 84 calculates the Ia data signal by the subtraction of a signal acquired by multiplying the I data signal by the coefficient A and a signal acquired by multiplying the Q data signal by the coefficient B. Moreover, the phase correction circuit 84 calculates the Qa data signal by adding a signal acquired by multiplying the Q data signal by the coefficient A to a signal acquired by multiplying the I data signal by the coefficient B.

The symbol filter coefficient which has received the phase correction is outputted to the carrier filter circuit 56c (signal e).

By filtering the symbol filter coefficient after the phase correction, which symbol filter coefficient is inputted from the phase correction circuit 84, in the frequency axis direction, the carrier filter circuit 56c performs interpolation processing, and extracts (calculates) the correction quantities in the frequency axis direction of the transmission path characteristics of all carriers to output the extracted correction quantities to the dividing circuit 56a as the carrier filter coefficients (signal g).

The dividing circuit 56a is a circuit which performs waveform equivalence processing by dividing a carrier signal (signal a) inputted form the FFT processing circuit 54 by a carrier filter coefficient (signal g) inputted from the carrier filter circuit 56c. Thereby, the phase correction which corrects a phase which has changed according to the gain of a reception signal can be performed to the carrier inputted from the FFT processing circuit 54.

The transmission path equivalent circuit 56 outputs the signal which has received the waveform equivalence processing including the phase correction to the demodulator circuit 58.

Here, to the transmission path equivalent circuit 56, frequency domain complex signals are input in series from the FFT processing circuit 54 with predetermined intervals in the order of the numbers of the carriers.

The correction coefficient table 82 reads correction coefficients corresponding to the gain acquired by the gain acquisition circuit 80 from the memory in the correction coefficient table 82, and outputs the read correction coefficients to the phase correction circuit 84. At this time, the correction coefficient table 82 can sequentially output the correction coefficients to the phase correction circuit 84 from the carrier number "0" by taking the synchronization of the transmission path equivalent circuit 56 with the phase correction circuit 84.

According to the present invention, in the demodulation of an OFDM signal, relations between phase changes (nonlinear distortion) occurring in the tuner unit 100 and gains of reception signals are previously stored in the correction coefficient table 82 as the correction coefficients. When the waveform equivalence of carrier signals which have received the FFT processing by the FFT processing circuit 54 is performed, the correction coefficient corresponding to the gain of the reception signal outputted from the tuner unit 100 is extracted from the correction coefficient table 82 to every carrier signal. The phase corrections of the carrier signals are performed based on the extracted correction coefficients. Then, after also performing the correction in the time axis direction and the correction in the frequency axis direction, it is possible to perform the waveform equivalence processing by the transmission path equivalent circuit 56. Consequently, because phase correction can be performed to every carrier based on the correction coefficient corresponding to the gain at the time of the waveform equivalence processing in the transmission path equivalent circuit 56 even in the case where a C/N value is deteriorated owing to phase changes occurring in the tuner unit 100 by amplifying a reception signal greatly, the influence on the receiving performance of the apparatus owing to the change of the gain of a reception signal can be curbed, and the deterioration of the C/N value can be prevented.

Moreover, because the relations of the phase changes and gains can be stored in the correction coefficient table 82 as the correction coefficients to every tuner 100 in advance, it becomes possible to acquire the best receiving performance to every apparatus, and to demodulate a received signal correctly.

4. Modified Example

The configuration of the OFDM signal receiving apparatus 1 in the embodiment mentioned above is an example for describing the present invention, and it is of course that the present invention is not limited to the configuration. For example, although the phase correction circuit 84 has been described as one being connected between the symbol filter circuit 56b and the carrier filter circuit 56c, the phase correction circuit 84 may be connected to intervene between the SP signal extraction circuit 56 and the symbol filter circuit 56b.

Figure 7:
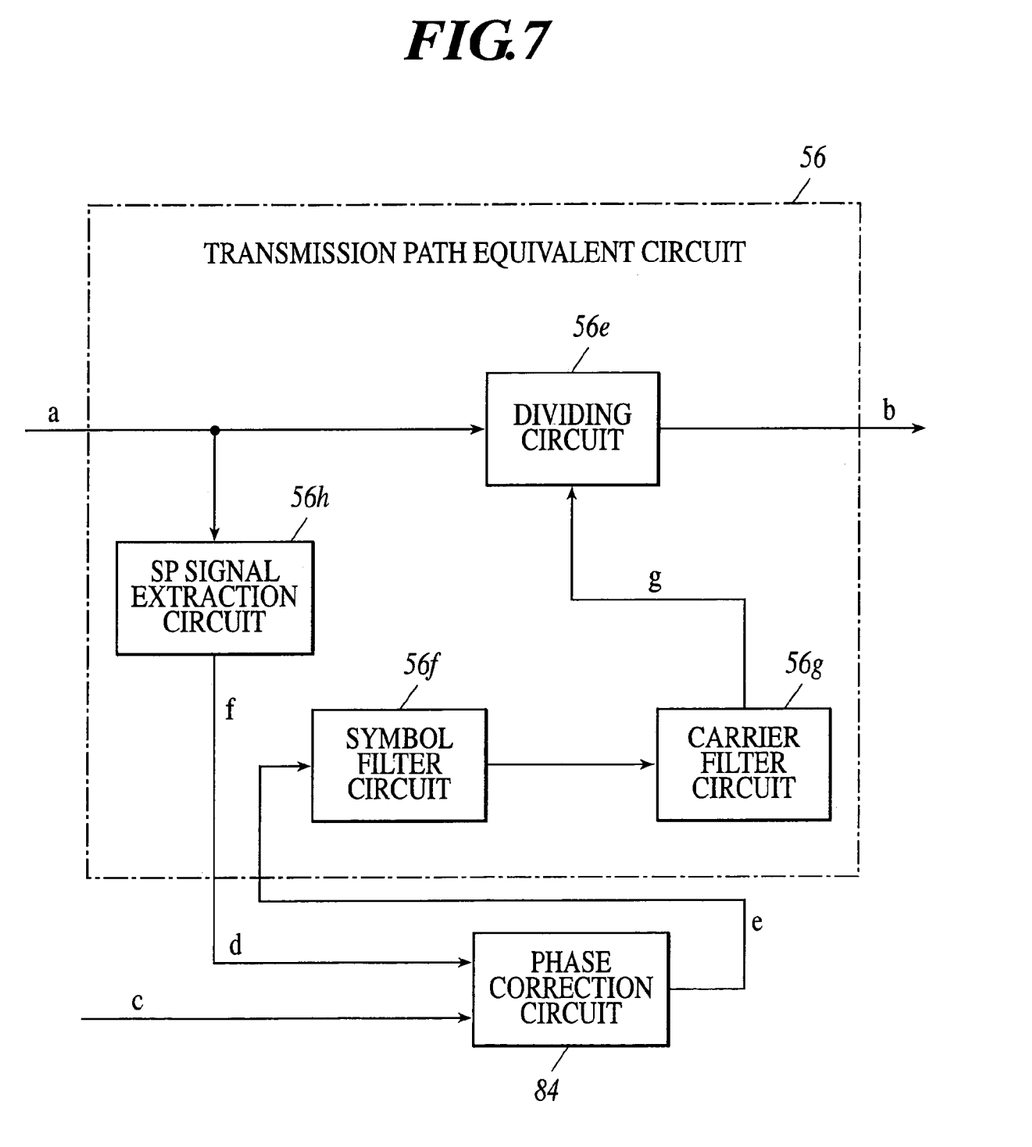
FIG. 7 is a block diagram showing a transmission path equivalent circuit and a phase correction circuit in a modified example.

The block diagram of the transmission path equivalent circuit 56 and the phase correction circuit 84 in this case is shown in FIG. 7. According to FIG. 7, the phase correction circuit 84 is connected to intervene between the output of the SP signal extraction circuit 56h (signal d) and the input of the symbol filter circuit 56f (signal e).

Here, the operations of each block in the transmission path equivalent circuit 56 and the phase correction circuit 84 are described.

As shown in FIG. 7, the transmission path equivalent circuit 56 extracts a synchronizing signal (SP signal) out of the carrier signals inputted from the FFT processing circuit 54 with the SP signal extraction circuit 56h, and outputs the extracted synchronizing signal to the phase correction circuit 84 (signal d).

To the synchronizing signal inputted from the transmission path equivalent circuit 56, the phase correction circuit 84 performs the phase corrections of an I data signal as the real part to an Ia data signal and of a Q data signal as the imaginary part to a Qa data signal. The phase correction processing at this time is performed based on the correction coefficients inputted from the phase correction coefficient table 82 as described pertaining to the transmission path equivalent circuit shown in FIG. 2. Then, the synchronizing signal after the phase correction is outputted to the symbol filter circuit 56f (signal e).

The symbol filter circuit 56f performs interpolation processing to each carrier by filtering the synchronizing signal inputted from the phase correction circuit 84 in the time axis direction, and extracts (calculates) the correction quantity in the time axis direction of the synchronizing signal. Furthermore, the symbol filter circuit 56f also extracts (calculates) the correction quantities in the time axis direction to the carrier signals in the time axis direction other than the synchronizing signal based on the transmission path characteristic of the synchronizing signal after the correction. Then, the symbol filter circuit 56f outputs the correction quantities of the synchronizing signal, the transmission path characteristic of which has been corrected, and the carriers other than the synchronizing signal to a carrier filer circuit 56g as the symbol filter coefficients (signal h).

By filtering the symbol filter coefficients inputted from the symbol filter circuit 56f in the frequency axis direction, the carrier filer circuit 56g performs interpolation processing, and extracts (calculates) the correction quantities in the frequency axis direction to the transmission path characteristics of all of the carriers to output the extracted correction quantities to a dividing circuit 56e (signal g).

The dividing circuit 56e performs waveform equivalence processing by diving a carrier signal (signal a) inputted from the FFT processing circuit 54 by a carrier filter coefficient (signal g) inputted from the carrier filter circuit 56. Thereby, the phase which has been changed according to the gain of a reception signal can be corrected to the carrier inputted from the FFT processing circuit 54. Then, the signal which has received the waveform equivalence processing including the phase correction is outputted to the demodulator circuit 58.

Consequently, it is of course that the phase correction circuit 84 may be connected at the position shown in FIG. 7 as long as the phase correction circuit 84 is connected before the carrier filer circuit 56g.

Incidentally, although the phase correction angles are described to be stored in the correction coefficient table 82a as the correction coefficients, the coefficient A and the coefficient B, described above, may be stored.

Figure 8:
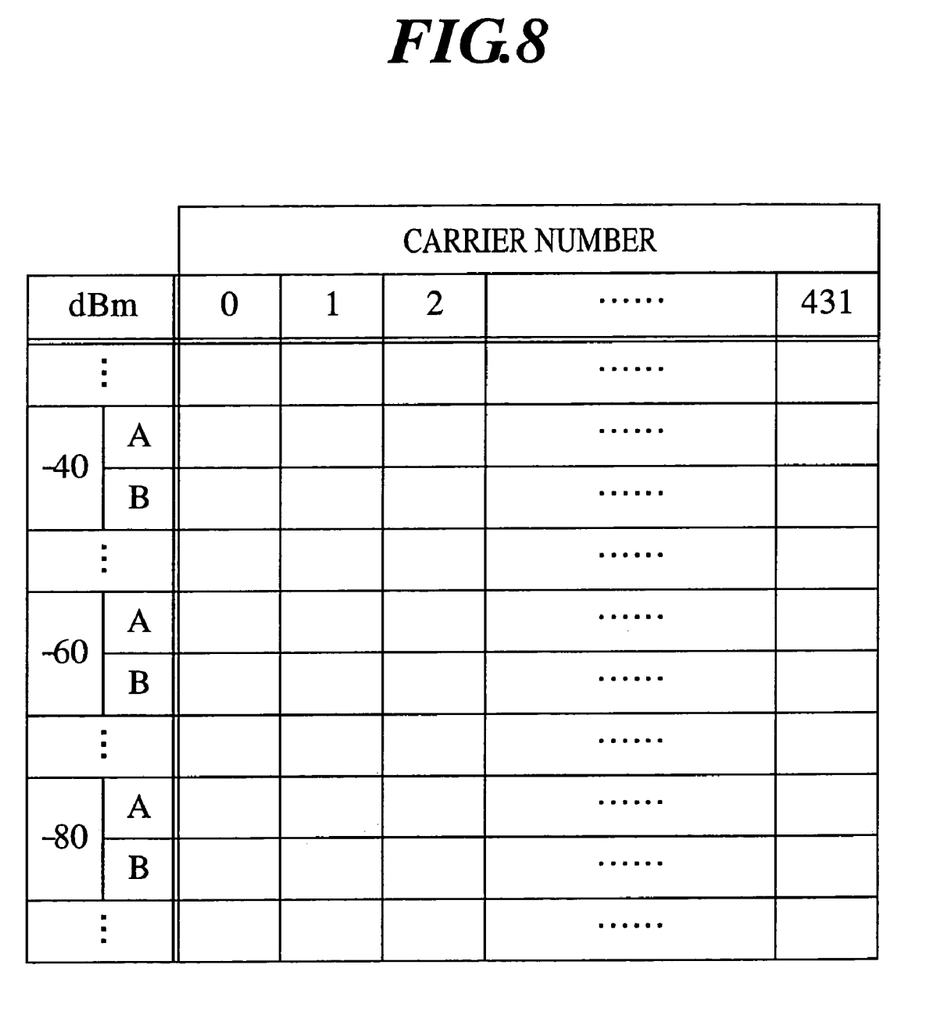
FIG. 8 is a correction coefficient table in the modified example.

FIG. 8 is a view showing an example of the data configuration at the time of storing the coefficients A and B used at the time of correcting phase changes of the frequency domain signals with the phase correction circuit 84. The gains corresponding to the levels of the input signals and the coefficients A and B as the correction coefficients are stored correspondingly to every carrier of the reception signals of the OFDM system. In this case, it is possible to perform phase corrections directly based on the coefficients A and B without operating the coefficients A and B from angles. Consequently, it is unnecessary to operate the coefficients A and B from the angles at every chance, and it becomes possible to operate at a high speed.

As described above, according to the present invention, in the demodulation of OFDM signals, relations between phase changes (nonlinear distortion) occurring in the tuner unit 100 and gains of reception signals are previously stored in a storage circuit as the correction coefficients. When the waveform equivalence of carrier signals which have received the FFT processing by the FFT processing circuit 54 is performed, the correction coefficients corresponding to the gain of a reception signal outputted from the tuner unit 100 are extracted from the storage circuit at every carrier signal. After the phase corrections are performed based on the extracted correction coefficients, the waveform equivalence processing can be performed by the transmission path equivalent circuit 56. Consequently, because phase correction can be performed to every carrier based on the correction coefficient corresponding to a gain at the time of the waveform equivalence processing in the transmission path equivalent circuit 56 even in the case where a C/N value is deteriorated owing to phase changes occurring in the tuner unit 100 by amplifying a reception signal greatly, the influence on the receiving performance of the apparatus owing to the changes of the gain of a reception signal can be curbed, and the deterioration of the C/N value can be prevented.

Moreover, because the relations of the phase changes and gains can be stored in the correction coefficient table 82 as the correction coefficients to every tuner 100 in advance, it becomes possible to acquire the best receiving performance to every apparatus, and to demodulate the received signal correctly.

Moreover, a symbol filter coefficient acquired by calculating a correction quantity in the time axis direction of a carrier based on the synchronizing signal in the symbol filter circuit 56b is outputted to the phase correction circuit 84, and the symbol filter coefficient outputted from the phase correction circuit 84 is corrected in the frequency axis direction by the carrier filter circuit 56c to perform waveform equivalence processing in the dividing circuit 56a.

Thereby, because the correction to a phase change generated in the tuner unit 100 by amplifying a reception signal greatly can be performed without performing a large circuit change of the conventional circuit, the reduction of a circuit scale and cost, and realization with low power consumption are enabled.

Moreover, a symbol filter coefficient acquired by calculating the correction quantity for correcting a carrier in the time axis direction by the symbol filter circuit 56f based on the synchronizing signal to which the phase correction has been performed in the phase correction circuit 84 is outputted to the carrier filter circuit 56g, and the correction in the frequency axis direction of the symbol filter coefficient outputted from the symbol filter circuit 56f is performed by the carrier filter circuit 56g to perform the waveform equivalence processing in the dividing circuit 56e.

Thereby, because the correction to a phase change generated in the tuner unit 100 by amplifying a reception signal greatly can be performed without performing a large circuit change of the conventional circuit, the reduction of a circuit scale and cost, and realization with low power consumption are enabled.

What is claimed is:

1. An orthogonal frequency division multiplex (OFDM) signal demodulator circuit for receiving an OFDM signal with a given tuner and demodulating the received OFDM signal, wherein in the OFDM signal, information is divided into a plurality of carriers and orthogonally modulated, said OFDM signal demodulator circuit comprising:
    a gain acquisition circuit for acquiring a gain of the OFDM signal received by the given tuner;
    a Fast Fourier Transform (FFT) processing circuit for converting the received OFDM signal into a frequency domain signal by performing FFT operation processing, and for outputting the carriers included in the frequency domain signal;
    a storage circuit for storing a plurality of phase correction coefficients for correcting phases of the carriers outputted by the FFT processing circuit based on the gain of the received OFDM signal in a frequency axis direction, wherein each phase correction coefficient is stored in association with one of a plurality of different gains and in accordance with a phase change of each of the carriers in the frequency axis direction on the given tuner;
    a synchronizing signal extraction circuit for extracting a synchronizing signal having a predetermined electric power and a predetermined phase from the carriers outputted by the FFT processing circuit, and for outputting the extracted synchronizing signal;
    a symbol filter circuit for outputting a symbol filter coefficient acquired by calculating a correction quantity to be applied in correcting the carriers outputted by the FFT processing circuit in a time axis direction based on the synchronizing signal outputted by the synchronizing signal extraction circuit;
    a phase correction circuit for extracting a phase correction coefficient from the storage circuit based on the gain of the received OFDM signal acquired by the gain acquisition circuit, for inputting the symbol filter coefficient from the symbol filter circuit, and for outputting the symbol filter coefficient corrected based on the extracted phase correction coefficient to correct the phase change that has occurred on the given tuner in the frequency axis direction;
    a carrier filter circuit for outputting a carrier filter coefficient acquired by calculating a correction quantity to be applied in further correcting the symbol filter coefficient outputted from the phase correction circuit in the frequency axis direction; and
    a dividing circuit for performing waveform equivalence processing to the carriers outputted from the FFT processing circuit by dividing a carrier outputted from the FFT processing circuit by the carrier filter coefficient outputted from the carrier filter circuit.

2. An orthogonal frequency division multiplex (OFDM) signal demodulator circuit for receiving an OFDM signal with a given tuner and demodulating the received OFDM signal, wherein in the OFDM signal, information is divided into a plurality of carriers and orthogonally modulated, said OFDM signal demodulator circuit comprising:
    a gain acquisition circuit for acquiring a gain of the OFDM signal received by the given tuner;
    a Fast Fourier Transform (FFT) processing circuit for converting the received OFDM signal into a frequency domain signal by performing FFT operation processing, and for outputting the carriers included in the frequency domain signal;
    a storage circuit for storing a plurality of phase correction coefficients for correcting phases of the carriers outputted by the FFT processing circuit based on the gain of the received OFDM signal in a frequency axis direction, wherein each phase correction coefficient is stored in association with one of a plurality of different gains and in accordance with a phase change of each of the carriers in the frequency axis direction on the given tuner;
    a synchronizing signal extraction circuit for extracting a synchronizing signal having a predetermined electric power and a predetermined phase from the carriers outputted by the FFT processing circuit, and for outputting the extracted synchronizing signal;
    a phase correction circuit for extracting a phase correction coefficient from the storage circuit based on the gain of the received OFDM signal acquired by the gain acquisition circuit, for inputting the extracted synchronizing signal outputted from the synchronizing signal extraction circuit, and for outputting the synchronizing signal corrected based on the extracted phase correction coefficient to correct the phase that has change occurred on the given tuner in the frequency axis direction;
    a symbol filter circuit for outputting a symbol filter coefficient acquired by calculating a correction quantity to be applied in correcting the carriers outputted by the FFT processing circuit in a time axis direction based on the corrected synchronizing signal from the phase correction circuit;
    a carrier filter circuit for outputting a carrier filter coefficient acquired by calculating a correction quantity to be applied in correcting the symbol filter coefficient outputted from the symbol filter circuit in the frequency axis direction; and
    a dividing circuit for performing waveform equivalence processing to the carriers outputted from the FFT processing circuit by dividing a carrier outputted from the FFT processing circuit by the carrier filter coefficient outputted from the carrier filter circuit.

3. An orthogonal frequency division multiplex (OFDM) signal demodulating method for receiving an OFDM signal with a given tuner and for demodulating the received OFDM signal, wherein in the OFDM signal, information is divided into a plurality of carriers and orthogonally modulated, said method comprising:

a gain acquisition step of acquiring a gain of the OFDM signal received by the given tuner;

a Fast Fourier Transform (FFT) processing step of converting the received OFDM signal into a frequency domain signal by performing FFT operation processing and outputting the carriers included in the frequency domain signal;

a storage step of storing a plurality of phase correction coefficients for correcting phases of the carriers outputted by the FFT processing step based on the gain of the received OFDM signal in a frequency axis direction, wherein each phase correction coefficient is stored in association with one of a plurality of different gains and in accordance with a phase change of each of the carriers in the frequency axis direction on the given tuner;

a synchronizing signal extraction step of extracting a synchronizing signal having predetermined electric power and a predetermined phase from the carriers outputted by the FFT processing step and outputting the extracted synchronizing signal;

a symbol filter step of outputting a symbol filter coefficient acquired by calculating a correction quantity to be applied in correcting the carriers outputted by the FFT processing step in a time axis direction based on the synchronizing signal outputted by the synchronizing signal extraction step;

a phase correction step of extracting a stored phase correction coefficient based on the gain of the received OFDM signal acquired by the gain acquisition step, inputting the symbol filter coefficient outputted in the symbol filter step, and outputting the symbol filter coefficient corrected based on the extracted phase correction coefficient to correct the phase change that has occurred on the given tuner in the frequency axis direction;

a carrier filter step of outputting a carrier filter coefficient acquired by calculating a correction quantity to be applied in further correcting the symbol filter coefficient outputted from the phase correction step in the frequency axis direction; and a dividing step of performing waveform equivalence processing to the carriers outputted in the FFT processing step by dividing a carrier outputted in the FFT processing step by the carrier filter coefficient outputted in the carrier filter step.

4. An orthogonal frequency division multiplex (OFDM) signal demodulating method for receiving an OFDM signal with a given tuner and for demodulating the received OFDM signal, wherein in the OFDM signal, information is divided into a plurality of carriers and orthogonally modulated, said method comprising:

a gain acquisition step of acquiring a gain of the OFDM signal received by the given tuner;

a Fast Fourier Transform (FFT) processing step of converting the received OFDM signal into a frequency domain signal by performing FFT operation processing and outputting the carriers including the converted OFDM signal;

a storage step of storing a plurality of phase correction coefficients for correcting phases of the carriers outputted by the FFT processing step based on the gain of the received OFDM signal in a frequency axis direction, wherein each phase correction coefficient is stored in association with one of a plurality of different gains and in accordance with a phase change of each of the carriers in the frequency axis direction on the given tuner;

a synchronizing signal extraction step of extracting a synchronizing signal having a predetermined electric power and a predetermined phase from the carriers outputted by the FFT processing step and outputting the extracted synchronizing signal;

a phase correction step of extracting a stored phase correction coefficient based on the gain of the received OFDM signal acquired by the gain acquisition step, inputting the extracted synchronizing signal outputted in the synchronizing signal extraction step, and outputting the synchronizing signal corrected based on the extracted phase correction coefficient to correct the phase change that has occurred on the given tuner in the frequency axis direction;

a symbol filter step of outputting a symbol filter coefficient acquired by calculating a correction quantity to be applied in correcting the carriers outputted by the FFT processing step in a time axis direction based on the corrected synchronizing signal from the phase correction step;

a carrier filter step of outputting a carrier filter coefficient acquired by calculating a correction quantity to be applied in correcting the symbol filter coefficient outputted from the symbol filter step in the frequency axis direction; and a dividing step of performing waveform equivalence processing to the carriers outputted in the FFT processing step by dividing a carrier outputted in the FFT processing step by the carrier filter coefficient outputted in the carrier filter step.

* * * * *